Jan. 6, 1959 D. F. OTHMER 2,867,655
PROCESS FOR RECOVERING VOLATILE ALIPHATIC ACIDS
Filed Feb. 20, 1957
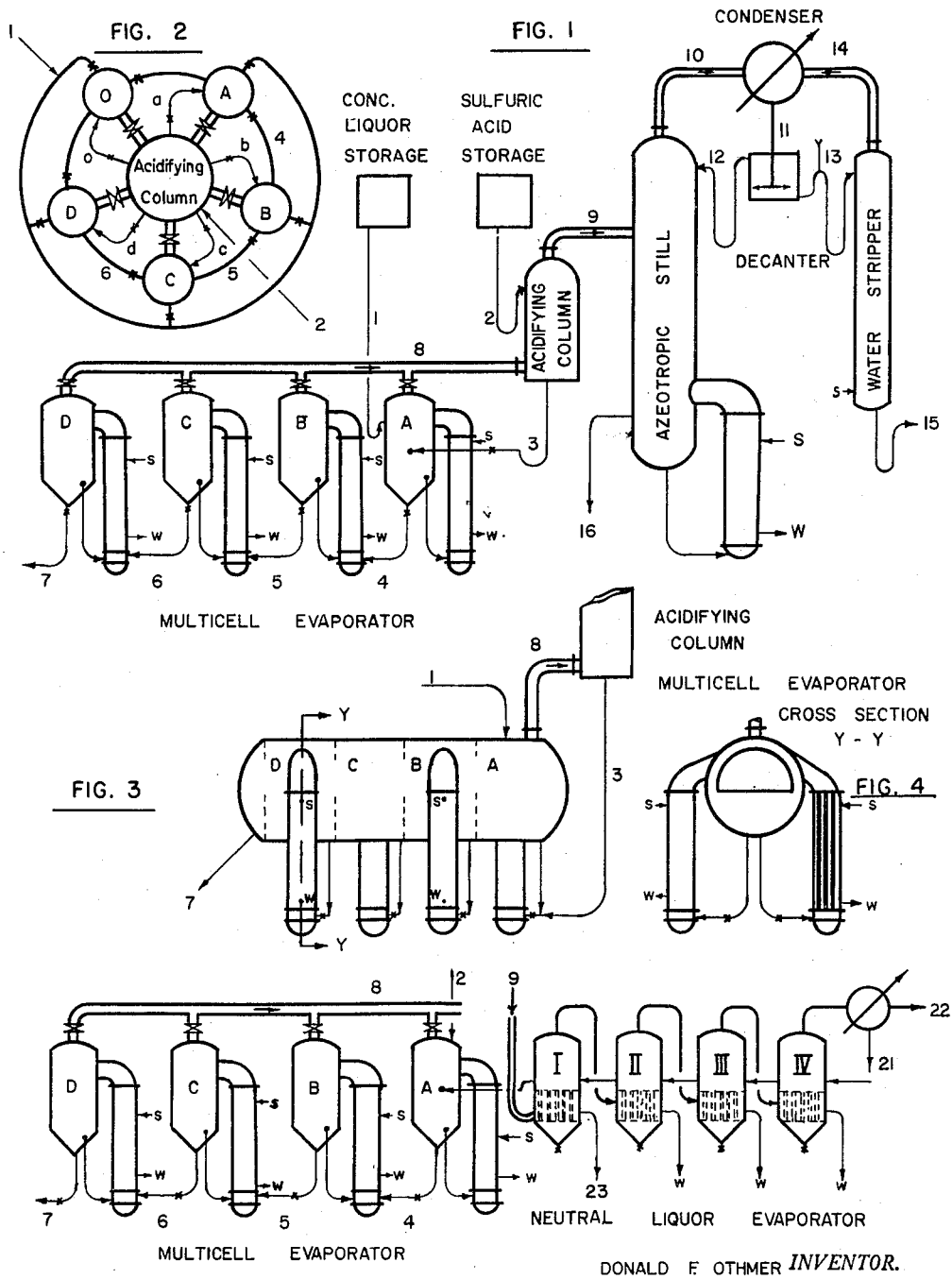
DONALD F. OTHMER INVENTOR.
BY Frank Makara
ATTORNEY United States Patent Office 2,867,655
Patented Jan. 6, 1959

2,867,655

PROCESS FOR RECOVERING VOLATILE ALIPHATIC ACIDS

Donald F. Othmer, Coudersport, Pa.

Application February 20, 1957, Serial No. 641,393

4 Claims. (Cl. 260—527)

This invention relates to a method of recovering in a concentrated form lower molecular weight, volatile fatty acids, for example acetic acid, from liquors resulting from the treatment of lignocellulosic material such as wood, bagasse, straw and other vegetative materials as well as from certain other liquors containing large amounts of salts or other organic or inorganic solids dissolved therein. Often these fatty acids are in the form of salts from which they are first liberated by sulfuric acid or other strong acid. By the novel steps of this invention, they are then evaporated from the liquors, together with much or all of the water therein, and are finally separated from the aqueous solutions resulting, preferably by azeotropic distillation of the water therefrom, or in some cases by extraction with a solvent for the fatty acids.

Hereinafter, the term "acetic acid" is often used. However, this most important acid of its series has with it in many industrial liquors relatively minor amounts of other volatile, homologous acids up to a maximum of about 10 or 15 percent of formic acid—based on total acids present, lesser amounts of butyric acid, and usually much smaller amounts of propionic acid and of others which may occur simultaneously in these liquors resulting from wood treating operations or other chemical processing. Hence, the acid referred to in this processing step may actually be a mixture of one or more of these homologues with the acetic acid mentioned. Correspondingly the acetate salts often obtained in chemical processing starting with neutral or alkaline liquors containing metallic cations may include the salts of these related acids are present in minor amounts in other stages of the processing, and the salts of the other volatile fatty acids may not always be indicated as being present.

Background of present practice

In the prior art there have been described many processes of separating the acetic acid from liquors containing free acetic acid by the extraction and/or azeotropic distillation of the liquors with organic solvents of greater or less immiscibility with water. In the usual case these processes have been primarily intended for use with liquors which do not have solids in solutions, or only a relatively small amount of such dissolved solids.

Some of these processes have been designed and used as an azeotropic distillation of water away from acetic acid and related acids coming in the liquors of many processes relating to the cellulosic industries as, for example, the dilute acetic acid solution obtained from the destructive distillation of wood.

Another dilute acetic acid solution obtained from the cellulose industries is that coming from the washing out of the acetic acid from cellulose acetate, following its precipitation as "flake" after its production and dissolution in excess acetic acid. Such solutions from cellulose acetate production usually contain a small amount of sodium sulfate which may be present due to the addition of sodium acetate or sodium carbonate to react with the small amount of sulfuric acid used as a catalyst in the prior esterification step. There is present in these liquors also a small amount of dissolved materials resulting from reactions of the cellulose, but such solids are relatively small in amount and do not influence greatly the azeotropic distillation of the water therefrom.

It has been common practice to use a pre-evaporator in concentrating acetic acid from either pyroligneous acid or spent liquor from cellulose acetate production, in order to supply the azeotropic column with a vapor feed, substantially free of the solid impurities. If a liquid feed is used directly, the solid impurities come into the azeotropic distillation column. The small amounts of solids are such, however, that they may be handled readily in the standard types of evaporators and stills used industrially. In such cases, the amount of dissolved solids is only a few percent at most, and hence is not important either in the design or operation of the process, as compared to certain other liquors from other processes, where the amounts may be several times or more of the amount to be recovered of the volatile acids or their salts.

Thus, in some other operations of the cellulose industries, acetic acid and its mixtures with other aliphatic acids, for example, propionic acid, butyric acid, and particularly formic acid, occur in the form of salts with the potassium, sodium, ammonium, magnesium, calcium or other alkaline or alkaline earth cation, which cation has been used in the cooking or other treatment of wood or other cellulosic materials. In order to liberate the organic acids from the salts, sulfuric acid or other strong mineral acid may be added, thereby yielding the corresponding salt of the strong acid in solution.

The handling of that group of liquors wherein the acetic and related volatile fatty acids are initially present as salts in relatively small amounts with respect to other solids present is the main purpose of the present invention, although other liquors with free volatile fatty acids and large concentrations of solids may also be processed.

Whereas the solids present in the solutions of the lower aliphatic acids may often be salts, there may be other solids present which may have relatively high molecular weights and are often of organic constituency. These solids may be in addition to salts formed by addition of strong acids to free the volatile fatty acids or other salts present, or they may be the solids which are present in aqueous solutions of these acids coming from other processing. The term "solids" is herein used to include all those salts of an organic or inorganic nature as well as any other solid or non-volatile liquid constituents, either organic or inorganic; said solid or non-volatile liquids are present in the state of a colloidal or true solution thereby lowering the vapor pressure of water from that of the vapor pressure of the corresponding pure aqueous solutions of acetic acid.

Also present in some of these liquors being considered are other high boiling liquids such as furfural and/or semi-solid materials such as organic waxes or wax-like bodies. These materials may be separately removed at some stage of this inventive process, in a manner to be described hereinafter.

The liquors which are advantageously processed by the methods of this invention are those which result from (among other industries): (1) the pulping of wood to give cellulose by various alkaline, acid, or neutral chemical reagents either inorganic or organic (the cellulose being more or less contaminated by unremoved lignin and other constituents depending on the efficiency of the pulping process); and from (2) the decomposition of wood by alkaline fusion (e. g. for the production of oxalates, etc.). Still other processes utilizing vegetative matter and of organic synthesis give relatively concentrated aqueous solutions of sugars or other solids together with lower aliphatic acids as such or in the form of salts. In most cases, the liquors result from such processing as undesired products of such treatment and contain various residual solid products in true or colloidal solution.

In the caustic soda treatment or fusion of wood, such as sawdust, with the consequent formation of sodium oxalate, the caustic soda also forms sodium acetate and sodium formate during the decomposition of the wood; and there are present various other organic products of the reaction, often called humus materials.

In the treatment of lignocellulosic materials with various chemical liquors for producing wood pulps; for example, among others, the neutral sulfite semi-chemical process, or the kraft or sulfate process, there are produced, along with other products, the salts of the lower aliphatic acids, principally the salts of acetic acid and of formic acid corresponding to the cation used in the basic cooking liquors. These salts appear in the residual black liquor resulting from the respective processes and have been shown by Hagglund and others to be equivalent to a total acetic acid and formic acid equal to 5% or more of the dry weight of the wood used.

In many cases, for one reason or another, the above liquors are evaporated to concentrate the salts. On treatment with sulfuric acid or other strong mineral acid of the above-mentioned liquors and other liquors containing inorganic acetates, etc., either with or without concentration, the acetic acid and related acids in the solution are liberated to give the corresponding inorganic salts of the mineral acid.

Thus, for example, a black liquor resulting from the neutral sulfite semi-chemical process for wood pulping is known to contain a relatively large amount of solids, from 8 to 12% usually, but possibly as much as 15 or 20% depending on the pulping operation and especially the pulp washing plant. These percentages are of total solids present, of which possibly 30% or even more are of the combined amounts of sodium acetate, sodium formate, and sodium butyrate. Usually, out of 100 parts of the acids considered as such, there may be about 10 to 12% of formic acid, from 1 to 4% butyric acid, and the balance as acetic acid.

The amount of acetic acid present in the liquors advantageously treated by the present process, and which may be substantially all recovered, may be from about 1% to about 30% expressed on the water plus acetic acid present after its liberation. While solutions of lesser strengths may be handled, this would not usually be economical if the recovery of acid were the only consideration. Solutions of greater strengths may be handled by modifications of this novel process, but such strengths of acid are not usually met in industrial liquors to be recovered.

In all of the industries where the above liquors are present, it may be desired to recover the acetic acid and other acids for one or more of the following reasons:

(a) So as to use or sell them in other chemical industry;

(b) So as to permit the recovery of other products of value in the residual liquors in a more or less pure form;

(c) So as to allow the liquors to be disposed of as waste to bodies of water.

Either in the free form or in the salt form, these aliphatic acids are a disagreeable constituent of waste liquors which are often presently being disposed of by dumping into streams, lakes, etc. as they have a high biological oxygen demand (BOD), i. e. during their fermentation they utilize much or all of the dissolved oxygen, with consequent damage to aquatic life requiring it.

In handling liquors from pulping processes it has long been standard practice to evaporate the liquors as they come from the digesters to a high solids content, e. g. 40 to 60% total solids. The concentrated liquor is then passed to a further concentrator or spray dryer, direct fired or other type, and thence to a burner wherein the organic material is burned, to give the inorganic material present as a smelt. This smelt may, in some cases, be reused in the pulping processes. In the operation as previously practiced, the sodium salts of the acetic and related acids go principally to sodium carbonate, and the value of the acids as such are lost. Such a furnace operation may also have as a principal object the elimination of the liquor as a stream pollution agent.

*Recovery of acetic acid by azeotropic distillation*

Aside from ordinary distillation and rectification which is very expensive of heat and equipment, the simplest process for recovery of the acetic acid is often the azeotropic distilling process. In using the novel steps of this invention this azeotropic process is usually preferred. The extraction processes which have also been used may sometimes cost less in operation even though they involve more steps than does the simple azeotropic distillation. Some of these known extraction processes may also be used in conjunction with at least one embodiment of the present invention.

The azeotropic distillation process as used for many years and referred to herein as one step of the present invention involves the addition to a distilling column of the acid and water (usually in a vapor phase). This column is charged with an amount of a solvent-liquid selectively chosen as a good solvent for extracting the acetic acid from aqueous solutions, but mainly chosen because it is substantially water insoluble and hence forms with the water a heterogeneous constant boiling mixture, i. e. steam distillation, or an azeotropic mixture (all these terms are used more or less synonomously). The solvent liquid used is called an entrainer or a withdrawing agent. This distillation of water and solvent is accomplished with a lowering of the effective boiling point of water from 100° C. to the temperature of the steam distillation, the vapors pass off to a condenser, where they are condensed, the two liquid phases which result upon condensing are an entrainer layer and a water layer. The entrainer layer is cycled back to the column as reflux to remove more water in the continuing azeotropic distillation; and the water layer is sent to an additional distilling column for the separation of the entrainer therein, since a small amount of entrainer is dissolved in the water layer. The volatile fatty acids (together with other liquids present as impurities and boiling higher than the azeotropic boiling point, e. g. furfural) are obtained at the base of the azeotropic column; and this mixture is separated, and individual liquids are refined.

*Flow diagrams*

In the attached drawings there are illustrated diagrammatic flow sheets of the inventive process and equipment which have been found to be most effective. The drawing figures are exemplary only and are not to be limitations on the modifications of either the processes or the equipment which may be used in this invention to secure the advantages thereof. For purposes of reference and emphasis, named parts are capitalized; and connecting pipe lines are numbered. These pipe lines are always fitted with all necessary valves for control of the operation, although all such valves are not shown in the diagrammatic figures.

In the accompanying drawing of this specification,

Fig. 1 is a diagrammatic flow sheet of the process,

Fig. 2 is a diagrammatic top view, showing a circular multi-cell evaporator arrangement, Fig. 3 is a schematic view of a multi-cell evaporator in a single shell, separated by interconnected baffles or weirs into a plurality of compartmental cells, Fig. 4 is a cross-section of the evaporator of Fig. 3, and Fig. 5 is another diagrammatic embodiment flow sheet of the process of this invention.

Basic flow sheet of Figure 1

In Figure 1, there is shown a tank for concentrated liquor storage. This tank is supplied for example, from an evaporator supplied with neutral sulfite semi-chemical liquors fed thereto at about 8 to 10% total solids and discharging at about 50% total solids, of which about one-third of the total solids are a mixture of sodium salts of acetic, formic, and butyric acids. The liquor from the concentrated liquor storage passes through valved pipe line 1 to cell A of a multi-cell evaporator. This cell A supplies vapors to the base of the acidifying column, as will be described below.

There is also a tank for sulfuric acid storage which supplies through valved pipe line 2 strong sulfuric acid to the acidifying column at a point near the top. The desired ratio of feed of sulfuric acid to the feed of concentrated liquor in an amount substantially equal to the stoichiometric ratio of the requirements for reacting with the salts of the volatile acids present is controlled by an automatic metering device, not shown. One suitable and standard type is a dual proportioning pump with two liquid cylinders and a common drive. The lengths of the strokes of the pistons are controllable so that various ratios of acid to concentrated liquor can be fed and maintained constant regardless of the number of strokes per minute, i. e. to obtain the rate of flow desired. Variations in the amount of salts of volatile acids in the concentrated acid, and in the strength of the sulfuric acid may thus be compensated.

The sulfuric acid descends the acidifying column and absorbs, condenses and holds down the water which rises in mixed vapors with acetic acid. This is by a reduction of the vapor pressure of water. The heat of condensation of the water which is condensed may be, in some cases, desirably removed by coils through which is circulated either cooling water or cold neutral liquor, either before or after the prior concentration. These coils are installed on the several upper trays of this acidifying column, but are not shown in the drawing. The sulfuric acid does not similarly condense the acetic acid vapors. This is not a complete separation, but does allow a part of the water to be returned to the evaporator for the purpose of steaming out more of the acetic acid from the liquor being acidified therein.

The sulfuric acid with some water which it has condensed, passes out of the base of the acidifying column and thence through pipe line 3 to cell A of the multi-cell evaporator, a single effect system with several parts. Several such cells are shown with independent bodies and outside heating units supplied with inlets near the top for steam S and outlets near the bottom for condensate water W. In cell A, the chemical reaction of sulfuric acid with the salts of the volatile acids present is accomplished to allow these acids to distill with water. All of the heat of reaction is thus immediately available and used in the evaporation step.

An evaporation of part of the volatile acids and water is accomplished in cell A; and the balance of the solution flows through valved pipe line 4 to cell B. Here additional evaporation takes place; and the remaining solution passes to cell C, thence to cell D. Some live steam is passed through the liquid in cell D to steam out the last of the acetic acid, when this is unusually difficult to remove, depending on the type of solids present. Finally from cell D there is discharged through valved pipe 7 the thick liquor of the maximum possible density with most or all of the volatile acids evaporated therefrom. Usually this discharge will be a slurry containing solids. However, it may be merely crystals separating from relatively clean liquors; and these crystals are then taken off through a salt removal system, as is standard practice, in such cases rather than through the simple pipe 7.

The purpose of the multi-cell evaporator is to distill the acetic acid and water from the feed liquor with a discharge of the solids as crystals, as a slurry, or as the most concentrated liquor possible, but without having the disadvantage that all evaporation and all heat transfer has to be done from and to this viscous thick liquor being discharged as would be the case when using only the single cell of an ordinary evaporator. It has been found that several cells may comprise the multi-cell evaporator, each having successively higher concentrations of liquid therein due to successive individual evaporations to remove individual amounts of water. For the purpose of this example, the number of cells will be taken as four, but from two to five has been shown to be a practical number for solutions encountered in industry. The action of the multi-cell evaporator is to some extent additive to the action of the acidifying column in exhausting all acetic acid from the acidified liquors. When working with those liquids having solids which are particularly easily handled (e. g. due to ready crystallization thereof) a smaller number of cells is required; and in fact only a single cell or standard evaporator may suffice if the solids are not over about twenty percent of the volatile acids after acidification.

The concentration of the liquor which is maintained in each cell, as in any continuously operating evaporator, must be the concentration of the liquor discharging therefrom; and while each successive stage has liquid therein which is more thick and viscous solution than the preceding one, only the last cell has the most viscous, with the poorest properties for heat transfer and evaporation. Thus, to some extent, the advantage of batch operation of a concentrating evaporator is achieved, i. e. much higher heat transfer at the start, falling gradually to the lowest at the finish, when thick liquor is being discharged. The usual continuous evaporator always operates under only the worst conditions.

Thus, if there is separately fed to cell A neutral concentrated liquor and sulfuric acid which gives, after the acidification, 50% total solids including the sodium sulfate and the lignosulfonates, etc. i. e. there is a total of one pound of water and acetic acid per pound of solids. Where four cells are used, and a final liquor is discharged having one-quarter of a pound of liquid (acetic acid + water) to one pound of solids, it may be assumed for simplicity that each of the cells accomplishes the same evaporation in terms of pounds of water.

Hence, when ten pounds of 50% liquor are fed, there will be 5 pounds of solids and 4 pounds of liquid leaving cell A, 5 pounds of solids and 3 pounds of liquid leaving cell B, 5 pounds of solids and 2 pounds of liquid leaving cell C, and 5 pounds of solids and 1 pound of liquid leaving cell D, i. e. one pound solids per one quarter pound of liquid. With the usual, continuous operation of a pre-evaporator, it is obvious that all evaporation would have to be done under the worst conditions, namely of the thick discharge (one pound solid in one-quarter pound liquid). This procedure gives an accompanying, considerably greater viscosity and elevation of boiling points, hence lower amounts of heat transfer, temperature drops, lower heat transfer coefficients, much larger surface required, greater power costs for pumps, etc. With this multi-cell evaporator, only the final cell D is operating under these least desirable conditions.

The difficulty of handling the liquor is tremendously decreased by the use of a less concentrated solution and hence there are improved the viscosities, the heat transfer coefficients, the power cost for pumping (where a forced circulation evaporator is used) or the natural velocities attained (where a thermosyphon effect is depended upon). All of these factors are better with the more dilute solution in cell A, with the least concentrated liquor. These factors decrease from cell B to cell C to cell D of the multi-cell evaporator.

The vaporous mixture of water and volatile acids from each of the cells of the multi-cell evaporator passes through a common pipe line 8, to the base of the acidifying column and thence contacts the descending sulfuric acid on its trays. These trays are similar to those of a distilling column used for standard purposes. In those cases where the solids present are not such as to cause fouling of the trays, the concentrated neutral liquor is added to one of the lower trays of the acidifying column; and the acidification is then accomplished herein, rather than in cell A.

The purpose of the acidifying column has been indicated to be the removal of water from the vapor stream of the multi-cell evaporator, and the return of said water to the liquid on being acidified in order to distill out more easily the acetic acid therefrom. This takes advantage of the hydroscopic ability of the sulfuric acid, which acid then will be used for the acidification. It has been found that in addition to sending sulfuric acid from the base of the acidification column through pipe 3 to cell A, by sending also a part of the acid run-down from the acidifying column to cell B, part to cell C, and in some cases even a part to cell D by pipe connections not shown, this addition of water along with sulfuric acid for the reaction to these latter cells has the same advantage as steaming for the removal of the acetic acid; and a larger amount of acetic acid is obtained from the liquor than if all acid run-down was to cell A. This addition of sulfuric acid to successive cells must not take so much of that otherwise going to cell A that more evaporation is accomplished in the earlier cells than the corresponding amount of reaction; otherwise this amounts to a corresponding concentration of neutral liquor fed, which is not the purpose of the multi-cell evaporator. This method of operation may be called a series feed of neutral liquor, with at least a partial parallel feed of sulfuric acid and water from the acidifying column.

When the solids are of such a nature as to crystallize from the evaporating solution readily, so that all of the acetic acid and water may be evaporated therefrom in a relatively easy salting, evaporation step, the action of the acidifying column in returning water to distill out the acid may not be necessary. Under these conditions, the acidifying column is dispensed with, the sulfuric acid is fed directly to the cell A; and considerable heat is saved since all heat of dilution as well as that of the reaction is immediately available for evaporation in cell A. All liquid (volatile acids and water) is evaporated in the several cells; and all solids crystallize out and are removed in standard equipment used for this purpose.

While not so advantageous in operation, because of the increase in difficulty of cleaning, the several cells may each be operated as batch evaporators with feeds of neutral liquor and of sulfuric acid from the base of the acidifying column or directly. The acidified liquor concentrates in each cell; finally both feeds are stopped; the evaporation is continued as far as possible; the vapor valve to the acidifying column (or directly to the subsequent system) is closed; and the cell is dumped. It is cleaned and started again as soon as possible. With several cells, always in different stages of operation, the variation in vapor feed strength is not excessive; and a flow controller thereon can supply corresponding variations in the steam supply to the several cells to maintain a constant vapor volume.

Vapors passing from the top of the acidifying column through pipe line 9 consist principally of water and the lower volatile fatty acids which are present, usually mainly acetic acid, together with such other volatile impurities as may be present in the liquors, e. g. furfural, etc. Some of the volatile impurities which often cause trouble in the later refining of the acetic acid are decomposed in this wash of vapors with strong sulfuric acid.

The operation of the azeotropic still is that conventional for this type of separating process, which brings the water and the entrainer together in an azeotropic mixture; and these vapors pass over through pipe line 10 to the condenser as a heterogeneous azeotropic mixture, which is condensed.

The two-phase condensate is passed through pipe line 11 to the continuous decanter where two liquid phases separate; the entrainer or solvent phase is passed back through pipe line 12 to the azeotropic still; the water layer, which is saturated with a small amount of entrainer, is passed through pipe line 12 to the water stripper column; and the water is discharged through pipe line 15 from the bottom thereof, free of entrainer-solvent and substantially free of acid.

In the base of the azeotropic still, by usual means, there is a reboiling of the substantially anhydrous acid mixture (containing also furfural and any other relatively less volatile impurities which have come therewith). This is withdrawn as a crude acid mixture through pipe line 16 to be subsequently separated and refined by known means.

*Flow sheet of Figure 2 with rotating utilization of cells*

Figure 2 shows another arrangement of a multi-cell evaporator with individual cells readily fitted for alternating the order of feeding the cells, to allow for cleaning, final concentration of thick liquor, and other flexibilities of operation. Figure 2 shows the four cells, A, B, C, D, in a circle around the acidifying column and each directly connected therewith by a valved vapor line to supply vapors thereto, and a valved feed line to receive sulfuric acid containing liquid therefrom. A fifth cell O, inoperative at times, is installed in this same circle. The valve in each of the vapor lines allows any one of the cells to be cut off from supplying vapors to the column; and the valve (*a*, *b*, *c*, *d*, or *o*) in the respective one of the liquid lines from the acidifying column allows the respective cell to be cut off from receiving sulfuric acid from the base of the column. Thus, by controlling the valves properly, the sulfuric acid can be fed from the acidification column into any one of the cells so that it would enter, say, cell A of the series. A circular pipe header allows the liquid to be treated to be fed from concentrated liquor storage through line 2 to any one of the cells by opening the corresponding valve. Also valved pipes are fitted so that cell A would then discharge to adjacent cell B through valved pipe 4, then to cell C through valved pipe 5, then to cell D through valved pipe 6—all in series and clockwise. For the moment cell O is not in use; and it is between what has been the first cell A and the last cell D.

The evaporation is continued until the liquor in cell D becomes more and more concentrated; and finally the heat transfer coefficient is reduced, due to the build-up in cell D of the solid content to a concentration where further evaporation is almost impractical. Meanwhile, the liquor in each of the previous cells is also becoming somewhat more concentrated, but not to the same extent. At this point, cell D is cut out of the system by shutting the valve feeding neutral liquor from pipe 2. Meanwhile, fresh liquor has been fed into idle cell O to make it the new first cell; its vapor line is opened to the acidification column; and its liquid line *o* from the acidification column is also opened, while line *a* to cell A is closed. Discharge from cell O is then made successively to cell A, and the liquid then flows successively to each cell in a clockwise direction; but the valve in line *d* is closed so cell D receives no more liquor.

Meanwhile, the liquor in former cell D now has been evaporating somewhat further, without feed, to the highest possible concentration. Superheated steam is added if necessary to remove as much as possible of any residual acid present, with vapors still passing to the acidifying column. The vapor valve from cell D is then closed; and the very thick liquor or sludge therein is dumped from a bottom valve, not shown, for further processing in separate equipment. When cell D is drained and ready for re-use, fresh liquor is allowed to flow therein; and it is ready to receive the most dilute solution of the series.

The process is continued with the cutting of cells out of service, cleaning, and starting up again. Hence, any tendency for accumulation of scale or other fouling is eliminated by draining the cell of the most dense liquor or sludge and putting it back into service with fresh liquor. The operation above described is a semi-bath operation, but the equipment may also be operated fully continuously or fully batch as described above for Figure 1. Also a greater or lesser number of cells may be used in series, or more than one cell may be out of service, than shown.

*Flow sheet of Figure 3 using a multi-cell evaporator in a single shell*

Figure 3 is a diagrammatic representation of one mechanical form of a particular type of multi-cell evaporator which has been found to be particularly useful. In this embodiment the several cells or stages are combined in a single shell body with external steam heated calendrias or tube bundles.

In this particular method of mechanically combining the several heating units and cells in a single shell or body, the neutral feed liquid comes to cell A from the base of the acidifying column and then passes to cell B by overflowing an internal baffle acting as a level control or feed weir, and then over another baffle into cell C and thence to cell D and finally discharges as thick liquor out of this last cell. Increase of liquid flow-in fills all cells, which may have successively slightly lower feed weirs. If the operating level is above the weir heights, or if there is an opening in each baffle below the liquid line, withdrawal of liquor from cell D will lower the level of all cells.

Each individual cell inside the same horizontal cylindrical body is formed by a semi-baffle with a large vapor space in the center for allowing vapors to pass from each cell out of the multi-cell evaporator to the base of the acidifying column, and in counterflow to the passage of liquid.

In Figure 3, as in Figure 1, the external heating units or calendrias of the individual cells of the multi-cell evaporator are shown as vertical shells with vertical tubes and are supplied to their lower extremities with liquor by a pipe from the body of the cell. (The circular system of Figure 2 may be so constructed also as a continuous, interconnected plural cell tank, although it is not so shown.) The liquor rises inside the tubes as it is heated and boiled by condensing steam outside the tubes and inside the shell. The boiling may be due to a natural thermal convective circulation, or may be assisted by a forced circulation with pumps at the bases of the respective heaters. These pumps, which may be attached to any or all of the calendrais, are not shown in any of the figures but are provided as desirable, depending on the physical characteristics of the liquors, and their tendency to foul the tubes.

The discharge of the liquor-vapor mixture from the tops of the tubes of each calendria of Figure 3 goes through a collecting nozzle and thence into the individual cell in a substantially tangentional direction to the inner surface of the upper shell with the liquid kept inside the cell by the half-ring-baffle. The baffle is shown as provided with a semi-circular opening for the discharge of vapors from cell to cell, counter-current to the flow of liquid which flows over the baffle wall at the straight, horizontal side or weir of the opening, successively from cell A to B to C to D. Finally, the most concentrated liquor, often with solids in suspension, discharges from cell D through pipe 7.

It is usually desirable to have a vapor flow counter-current to liquid flow in a multi-cell evaporator if all cells are in the same body, so that the vapor from the least concentrated liquor will never be in contact with the liquids from the more concentrated liquor. It would tend to be absorbed thereby. This absorption is relatively minor, however, because all of the liquids are presumably vaporizing rather than absorbing vapors.

*Cross section in Figure 4 of a multi-cell evaporator in a single shell*

Figure 4 is a cross-section of the multi-cell evaporator of Figure 3 to show the method of arrangement of the calendrias for the respective cells alternately on opposite sides of the shell, for ease of access and piping connections. Also, Figure 4 shows the shape and arrangement of the baffles, the upper or semi-circular arcs or rings of which keep apart the discharges of the adjacent calendrias on the top of the shell. The lower semicircles keep the liquid of different concentration apart in the respective cells; and the straight edge weir (shown as a diameter although it may be another cord either higher or lower, and of successively lower heights for successive cells) acts to control overflow of liquid from right to left.

*Flow sheet of Figure 5 with interconnected neutral liquor evaporator and multi-cell evaporator*

In Figure 5 is shown still another embodiment of the invention, wherein the preliminary concentration of the neutral liquor normally done in a multiple effect evaporator may be correlated with the acidification, and with the multi-cell evaporator for evaporating acetic acid and water from acidified liquor. In this case, a backward feed of the multi-effect neutral liquor evaporator is shown with four effects fed in sequence IV, III, II, I. Instead, there may be a forward flow (I, II, III, IV) or a mixed flow sequence (II, III, IV, I) if necessary due to the change in the physical characteristics of the liquor during processing, or for other reasons.

Herein is shown the sulfuric acid being fed through pipe 2 with the concentrated neutral liquor from the neutral liquor evaporator to cell A of the multi-cell evaporator. All of the cells of the multi-cell evaporator together act in parallel as a single additional effect superimposed on the head end of the neutral liquor evaporator to make a quintuple effect evaporator overall. The acidification takes place in cell A; the balance of the cells are operated as described under Figure 1; and the vapors from the combined cells are passed through pipe 8 and its immediate connection, to pipe 9 to heat the calendria of effect I of the neutral liquor evaporator. In the calendria of effect I, the vapor mixture of water and volatile acids from the multi-cell evaporator are condensed to give up their heat, just as would fresh steam from the boilers, to accomplish the operation of the neutral liquor evaporator in the successive effects. The calendria in this case is made of acid-resisting materials; and the condensate mixture of the dilute fatty acids is passed through a steam trap as a liquid feed to a standard azeotropic concentrating system or to a liquid extraction system or other means of concentrating the acetic acid.

While the acidification column is not shown in Figure 5, this may be used in series with the multi-cell evaporator as described with Figure 2 or Figure 1. The vapors leaving the several cells then pass through pipe 8 and through the acidifying column on their way to the calendria of effect I of the neutral liquor evaporator through pipe 9 which is shown as not being connected to pipe 8 to indicate this possible insertion of the acidification column. As described above, this use of the acidifying column takes advantage of the ability of the sulfuric acid to remove some of the water passing as vapors out of the multi-cell evaporator and improves the distillation of the last traces of the acetic acid from the liquors being finally discharged from the multi-cell evaporator. Sulfuric acid is fed to the acidifying column, when this is used; and its operation otherwise is as above described.

But whereas Figure 5 shows the multi-cell evaporator as the high temperature and high pressure effect of such a system, it is sometimes more advantageous to have it at some other effect than the high pressure effect of a quintuple effect system. It may indeed be any one of the effects of the entire system; and it may be interposed between the several effects which accomplish the neutral liquor evaporation, if the proper arrangements or feed pipes are made to keep the neutral liquors within their own particular bodies, and to utilize the condensate of the mixed vapors of acids and water for feeding the acid concentrating system, external to the evaporator system shown. It is possible to have the multi-cell evaporator as the last or lowest pressure effect of this quintuple-effect, the combination evaporator handling both the acid liquors and the neutral liquors. This then discharges vapors to a special, final, condenser. This arrangement is used only under most unusual conditions of ease of crystallizing the solids from the solution, without much elevation of boiling point. The high concentration of the solids which then has to be handled in the last cell of this unit which makes it undesirable to have these most concentrated liquors at the final effect.

In any case, a balance of the heat and materials is such as to secure the maximum thermal efficiency, i. e. the minimum amount of steam used per pound of neutral liquor handled. There must also be considered, however, the difficulties of handling the high solids concentrations in the multi-cell evaporator; and with a greater number of effects in the neutral liquid evaporator, a higher amount of solids will go to the acidifying evaporator. This means a higher concentration of acetic acid in the vapors therefrom but somewhat more difficulty in obtaining the last of the acid from the solids.

Thus, if only one effect is used for the neutral liquor evaporator (and the multi-cell evaporator always acts only as one effect), about one pound of water would be removed from the neutral liquor and one pound of water (neglecting sensible heats, heat of the acidification reaction, and the latent heat of the acetic acid) would then be distilled in the multi-cell evaporator. Because of the low concentration obtained in the neutral liquors before acidification, this would result in a very dilute acid feed to the azeotropic system or to the extractor, which follows for concentrating the acid liquor discharge. On the other hand, when four effects are used in the neutral liquor evaporator as shown in Figure 5, and if sensible heats, reaction heats, and latent heat of acetic acid are again neglected, about 4 pounds of water would be removed before the acidification, and hence, correspondingly, a much smaller amount of water would come into the distilled acid and water vapors which are condensed to pass for subsequent water removal in the acid concentrating system. It has thus been found that not only does an increase in the number of effects for evaporating neutral liquor in such a combined evaporator increase the concentration obtained—as in normal practice, but it also increases the concentration of acetic acid discharged from the multi-cell evaporator, and thus reduces also the steam required for the final acid dehydration.

In this as in every case, it is apparent that the highest possible concentration of the neutral liquor should be obtained before it is acidified in order to minimize water to be removed from the acetic acid in the later system for concentrating acetic acid. Sufficient water must be allowed to remain, however, to steam out the acetic acid completely from the acidified liquor.

While different methods of operation, selected according to the properties of the particular liquid being processed, may be more pertinent to one or more of the variations of the invention described under the several figures or flow sheets, it is usually possible that these variations may be used with another of the figures also, even though this is not always indicated.

*Evaporation of acetic acid from acidified solutions*

In the distillation of water and acetic acid out of a solids-containing solution, it would normally be expected that the solution would have to be evaporated to dryness in order to obtain all of the acid therefrom. It has been found, however, that by taking advantage of physical properties of the solutions through this process invention, that substantially all of the acid may be evaporated, if necessary, without having to distill the last of it out of an entirely dry material resulting from the complete dessication of the solids originally present.

There may be used to advantage the well known elevation of boiling point of the water by the solids, or a reduction of the vapor pressure or activity of water without a corresponding reduction of the vapor pressure or activity of acetic acid. This means that the water itself is preferentially held by the solids. Since acetic acid is not so affected by most solids which are encountered, it preferentially distills from the water. This is particularly true when there is present dissolved solids which are hydroscopic. For example, when acetic acid is present as calcium acetate in liquor, after neutralization with lime of pyroligneous acid, the acetic acid may be freed by the addition of hydrochloric acid instead of the sulfuric acid usually used. There is thus formed calcium chloride; and the acetic acid preferentially distills away from the water in the successive cells of the multi-cell evaporator because of the high retentive ability of calcium chloride for water. (The acidifying column could not be used with hydrochloric acid because of its volatility.) Other salts, including sodium sulfate, and many organic solids have similar retentive abilities, although not usually to the same extent.

Another factor which allows the removal of the acetic acid as effectively as possible with a minimum of water is the multi-cell evaporator described above. One method of making this particularly effective is, as described elsewhere, by the addition of part of the sulfuric acid, either directly or from the base of the acidifying column to two or more of the cells rather than merely to cell A.

A most important aid in distilling out the acetic acid from the thick liquors is the use of the acidifying column wherein the sulfuric acid fed into the top of the column as strong acid, preferably approximately 100% $H_2SO_4$, washes down against vapors of water and acetic acid passing therethrough. The sulfuric acid is added in that amount required for the acidification of the sodium salts of the aliphatic acids, but exists as free acid here. The sulfuric acid preferentially absorbs or hydrates with some of the water to condense it, thus depleting the vapor stream of part of its water and allowing the acetic acid vapors to go through practically unaffected. The sulfuric acid is diluted somewhat, as it is heated, and it discharges from the base of the acidification column usually containing from one-half to four times as much water as acid. This acid discharge has absorbed some of the heat of dilution of the sulfuric acid added. It is further diluted in contacting the liquors in the multi-cell evaporator; and this heat of dilution is utilized directly in supplying heat for the vaporization of acetic acid and water. The amount of heat otherwise required to be added is reduced accordingly.

A further advantage of this countercurrent washing of the vapor stream by the sulfuric acid is that some volatile impurities may be chemically removed by the contact with the strong sulfuric acid. An additional help—in order to remove a part of the heat of hydration or solution of sulfuric acid and the heat of condensation of the water—is the use of cooling coils in this section of the acidifying column. These are not shown in the drawing, but they may be supplied with cooling water, in which case, the heat is lost or with neutral liquor in which case the heat is saved, by supplying a heated feed either to the earlier concentrating evaporator, if dilute neutral liquor is used, or to the multi-cell evaporator if concentrated liquor is used.

The important consequence, however, is that as the more dilute sulfuric acid reaches the liquid which is then to be acidified, there is a greater amount of water freed then from the hydroscopic effect of the sulfuric acid, which is used up chemically. This water distills off the acetic acid more effectively than would otherwise be possible from the liquors coming from the neutral liquor evaporator if then acidified with the strong acid fed to the acidifying column.

Thus, a certain amount of water in distilling up the acidifying column with the acetic acid is removed from the vapors and brought down by the sulfuric acid to be released at the time and place where the acetic acid is released, and thus distills out therewith. This presence of water at the reaction zone receives all of the heat of the reaction and uses it for the evaporation of water and accompanying acetic acid. In this way it is seen that some water cycles around and around the acidifying column and cell A, removing acetic acid by "steaming" it out of cell A with a greater amount of water than otherwise would be present and passing it out the top of the acidifying column with a lesser amount than enters the bottom. This steaming has long been the standard practice using saturated or superheated steam itself in a thick liquor or slurry from which acetic acid is to be removed by evaporation. The benefit here is accomplished with a minimum of heat cost; and such accomplishment reflects in eliminating more of the acid from a stronger neutral liquor than could otherwise be handled in this system. This effect is further accentuated by passing some of the acid from the base of the acidifying column to subsequent cells B, C, and possibly D as mentioned above.

Another very major advantage of the acidifying column, correlated as part of the evaporator, for acidifying liquor is that all of the heat of the chemical combination of sulfuric acid with the sodium salts in forming this acidification is immediately given up in accomplishing the evaporation of the water and the acetic acid. In other systems for acidification, prior extraction systems, for example, it has been necessary to pre-cool the neutral liquor after it came from the neutral liquor evaporator in a heated condition, before adding the sulfuric acid, to prevent immediate volatilization and loss of water and acid. Furthermore, it was often necessary then to after-cool the acidified liquors which result before going to an extracting column, particularly when a low-boiling solvent was used as the extracting agent. In the present case, not only is any reaction heat not wasted, but it is actually fully utilized for the purpose at hand of distilling acetic acid from the liquors, and thus reduces the corresponding steam consumption.

Either with or without using the acidifying column, the operation of the multi-cell evaporator, as a source of vapor feed to the azeotropic column has been found to be much improved by the use of a flow controller in giving a constant or approximately constant flow of vapors. As vapor flow through pipe 8 or pipe 9 diminishes due to increasing resistance to heat transfer due to the solutions becoming more viscous, or as one cell is removed or changed in service, the controller demands more steam through an increase in pressure and temperature on the steam supply. Each separate calendria of the several cells may have the same steam pressure therein, or they may be controlled so that there is a greater temperature drop in the most concentrated liquor because of the greater elevation of boiling point of the more concentrated solution. Even with a flow controller (and this may control steam to any one or more than one calendria in maintaining a constant vapor flow to the azeotropic column) the concentration of acid in the vapors and hence the amount of water therein may vary, particularly when the semicontinuous method of operation is used. The more cells in the multi-cell evaporator the less this flow rate will vary; and four has been found to be a good number. A fifth cell as a spare one may be used to allow shut-down for removal of salts from time to time.

A modern type of centrifugal, thin-film, evaporator may be used as one of the cells or as a final evaporator for the discharge from the multi-cell evaporator. Inside of a horizontal or vertical shell with a steam jacket for heat transfer is a system of rotating scraper blades which cause a positive flow of less concentrated liquor from one end to more concentrated liquor at the other. An almost dry discharge is sometimes possible and this will distill the maximum of the acetic acid out of the system.

In the rotation of cells of Figure 2 or in the straight series operation of Figure 1 wherein some of the very concentrated liquor must be continuously withdrawn from cell D, containing the most concentrated liquor, it has been often found possible to operate a crystallizing chamber suitably fitted to any one or several of the cells, usually D, to accomplish a continuous formation of crystals and thence discharge thereof, in those cases wherein crystals are formed due to the concentration of the liquors. The mother liquor discharging from the centrifuge or other equipment for separating crystals from the crystallizer carry most or all of the organic solids but less of the crystal material. Some part of the organic solids in the concentrated mother liquor is recycled back to the evaporator to remove any acetic acid which still remains; and under some conditions it is desirable to recycle a part of this most concentrated liquor, but with a minimum amount of acetic acid back to the cell A. Alternately, this goes to separate equipment for disposal.

This concentrated mother liquor from a crystallizer may be evaporated in a cell of its own in the multi-cell evaporator for its final evaporation to a concentration where it becomes too thick for further evaporation. Then it is passed to a means of disposal, which would be in many cases a burner for burning the organic material therefrom.

In some cases it has been found profitable to extract this concentrated liquor or the crystals which have been removed therefrom with organic solvents to separate some of the values of this organic material before burning of the less valuable organics.

This final extraction of the mother liquor for removal of solvent-soluble waxes or other materials has then preferably been done with the solvent which, because of its azeotropic properties, is used in the subsequent azeotropic distilling column. Hence, after the extraction, when the mother liquor is passed to a cell of the multi-cell evaporator, before final disposition by burning, any of the solvent remaining is distilled off and passed ultimately to the azeotropic distilling system; and the solvent is thus recovered.

In the same way crystals, which are formed in a crystallizing unit are washed free of organic solvents with the entrainer solvent to get rid of any organic waxes and similar materials. The crystals are then steamed with superheated steam to remove the solvent which is passed back to the azeotropic system.

In this same manner, it has been found desirable to extract the concentrated neutral liquors with the entrainer solvent, in order to extract such soluble materials before these neutral liquors go to the acidification. The residual solvent is recovered by steaming out in the multi-cell evaporator. Many of the impurities in the neutral liquor are often not in a chemical form that is extractable, i. e. they may be sodium salts of complex organic acids. They may be put in an extractable form at a pH either just above the acidification or some pH between neutrality and the isoelectric point for the freeing of the acetic acid. It has thus been found to be possible to adjust the pH to make the impurities soluble in the solvent by adding an amount of sulfuric acid too small to free the volatile acids, but sufficient to free the complex waxey or other acids so that the solvent can extract them.

Acidification

In previous operations involving the acidification of such liquors with sulfuric acid for the subsequent extraction of acetic acid, the practice has been to accomplish the acidification in a conventional tank with agitators or in other liquid handling equipment.

There has always been required in prior art processes involving a recovery of the acid by subsequent extraction an excess of sulfuric acid over the stoichiometric amount. This has been due probably, for two reasons: (a) some of the sulfuric acid may go into side reactions with the organic materials present and (b) there may be a tendency for the acidification reaction not to go to completion—or its actual reversal—due to the high concentration of sodium sulfate which will be formed in the solution. Hence, in the subsequent extraction with a solvent only the acetic acid immediately present in the solution may be available, particularly if the extraction is accomplished in a very short time; and thus the final amount of acetic acid is never formed by the reaction going to completion, unless there is an excess of sulfuric acid present.

By the freeing of the volatile acids in the multi-cell evaporator, these disadvantages have been largely eliminated; and the loss of sulfuric acid required by its addition in excess is almost eliminated. The sulfuric acid is diluted to some extent by the water it absorbs in descending the acidification column when this unit is used; and it contacts the hot neutral feed liquor to give a very fast reaction of acidification. Since the right amount of sulfuric acid is present for the freeing of the acids present as salts, this is accomplished first and ahead of other reactions. The acids are evaporated off rapidly and to a large extent, before side reactions can take place; and in any case, the last of the volatile acids are completely freed and vaporized out of the reacting, liquid phase in the subsequent evaporating stages of the multi-cell evaporator. This evaporation of the free acids away from the reacting zone thus gives a greater yield of volatile aliphatic acids than can an extraction, if there is incomplete reaction, otherwise, since evaporation leaves the sodium sulfate as a solid, non-volatile constituent, and removes it from the aqueous phase by precipitation as it removes the acids by evaporation. The volatile acid content in the vapors varies from cell to cell since the vapor streams are always combined, it is the effective average composition which passes to the acidifying column and thence to the azeotropic still.

While the multi-cell evaporator gives the maximum advantages of this invention, a simple pre-evaporator wherein is accomplished the acidification, with or without the use of an acidification column, will have many of the advantages, i. e. utilization of the heat of reaction, reuse of water sent down by the acidification column to steam out acetic acid, etc.

Direct utilization of azeotropic distillation

In the above there has been described an azeotropic distillation for the steam distillation of the water from the vaporous mixture with acetic acid and other volatile aliphatic acids being fed to the column. This azeotropic distillation may use any one of the known entrainers wherein either there is an excess amount of entrainer in the column so that there is actually a rectification of the entrainer from the acetic acid in the lower part of the column, a correct amount of entrainer wherein there is no rectification necessary in the lower part of the column since the entrainer disappears in going down the column at the same level as does the water, or an insufficient amount of entrainer, wherein the last part of the water separates by being rectified out of the acetic acid. One suitable entrainer is methyl isobutyl ketone, but other entrainers in the range from a normal boiling point of about 100 to 150° C. may be utilized. Preferably a higher boiling one in this range is used, since it will have a lower steam consumption; and if it is simultaneously has a good extraction coefficient for acetic acid, it will tend to prevent acetic acid distilling overhead and thus being lost, even with a small amount of reflux.

When coupled directly with an azeotropic distillation as in Figure 1, or some modification thereof, the present system is simple and economic for handling liquors of this type, particularly as compared to an extractor system. Herein this simple equipment is the acidification plant, the acid concentration plant, the raffinate column; while eliminated are extractors, pumps, their piping and instrumentation, intermediate storage tanks, heat transfer equipment for heating and/or cooling before and after acidification, intercooling, etc.

These same advantages of simplicity may immediately be obtained by using a straight rectification-distillation tower in place of the azeotropic still. The cost of steam will be very high, however, and the number of plates required will also be large, especially if the water discharged overhead is to be substantially acid free.

Use of invention with liquors from wood pulping

As indicated above, one of the important industries wherein this invention is advantageous is in the production of pulp by chemical digestion of wood. The liquors from some of the several processes contain acetic acid and the other low molecular weight homologous aliphatic acids in the form of salts. The recovery of these volatile acids also makes it easier to recover the other valuable constituents of the process liquors, such as furfural, waxes and similar organic bodies.

Of possibly greater importance is the fact that the liquor discharged from the multi-cell evaporator after removal of the acetic acid and other volatile fatty acids may be treated to recover the sodium sulfate content, produced upon the addition of the sulfuric acid. This sodium sulfate has many industrial applications, such as for general use in the chemical industry, for use in kraft pulping operations, or otherwise.

If a recovery furnace is used, as is common after concentration of black liquors from pulping operations, the sodium salts of the acetic acid and the formic acid give soda ash when burned. Thus, working with liquors from the neutral sulfite process, this burning of concentrated black liquors gives too high an alkalinity in the smelt for it to be reused in other pulping operations such as in the kraft process.

However, by the use of the present process with neutral sulfite liquors for the conversion of the sodium acetate and sodium formate to sodium sulfate, and the consequent removal and recovery of the acids, the final smelt made from the concentrated slurry or solids discharged is largely sodium sulfate which may be used in other processes, including pulping of wood by the kraft process.

In the recovery of acetic acid by this process from liquors of the kraft process itself, there is a large amount of free alkali to be neutralized by the added sulfuric acid before the acetic acid and formic acid are freed by the sulfuric acid. This produces a corresponding amount of sodium sulfate from the free alkali and this is added to that from the acetate and formate decomposition. This may be more than can be reused in its entirety in the recycle liquor system. On the other hand, since the usual make-up of liquors recycling in the kraft process requires the addition of fresh sodium sulfate, as well as sulfate radical from sulfur burning, it follows that there can be used a substantial part of such sodium sulfate formed from sulfuric acid. Hence, a part of the black liquors (between 10 and 50%) of a kraft plant may be processed to free and subsequently recover the acetic acid as described, by the addition of sulfuric acid and the formation of sodium sulfate. This new sodium sulfate from sulfuric acid is present in the solids discharged as such or as a slurry after exhaustion of acetic acid in the evaporator system described. This sodium sulfate is thus the make-up for the pulp liquor system as a whole, including the balance of the liquors (50% to 90%) which may be processed as before, without recovery of the acetic acid and formic acid. The thick liquor or solid discharge from the multi-cell evaporator is added to the other liquors before going to the drier and the furnace. By this means, a substantial fraction, between 10% and 50% of the liquors, may be processed to give that amount of the total volatile acids which are otherwise lost.

In those cases either in the kraft liquors or other liquors where there is an alkali present which would give off a gas such as $CO_2$ on acidification, a part of the sulfuric acid may be added to the liquor prior to the acidification column in order to prevent the formation of carbon dioxide there, which would then have to pass through the distillation system.

In the processing of kraft liquors, tall oil soaps are usually recovered from the alkaline liquors during their concentration. If none, or only part of the tall oil soap, is removed at this evaporation stage, tall oil acids will be liberated and may be separarted in the multi-cell evaporator step from the liquors after acidification, and desirably, before crystallization of sodium sulfate. There may be accomplished in one or more of the cells this tall oil separation by withdrawal of a stream of liquor and decantation, with recirculation back to the cell, or the next one, of the liquor free of tall oil.

Thus, on using this invention with black liquor from kraft pulping, the addition of sulfuric acid for recovering acetic acid from a part of the liquors replaces the sulfur and sodium sulfate make-up, which would otherwise be used. Also, if the cost of sulfuric acid on a sulfur basis were equivalent to that of sulfur and sodium sulfate make-up normally used, it would not be an added cost in producing the amount of acetic acid recovered from the fractional amount of the total liquors treated, since it would be the normal cost of make-up chemicals for pulping the wood. If greater, due to the cost of making sulfuric acid from sulfur as compared to that for making sulfur oxides, the difference would be the amount to be charged against the cost of recovery of the acetic acid.

The interrelation of the use of this invention to processing liquors from either the neutral sulfite or the sulfate process or both is thus possible with large commercial advantages.

It is sometimes possible to crystallize out excess solids after evaporation to a high concentration and before the acidification. The liquors will thus contain correspondingly less of other constituents during recovery of acetic acid and may cause less trouble therefrom.

*Modifications of use*

In some cases acetic acid is present as such in solutions after processing of vegetative materials, organic syntheses or other, and containing considerable solids or non-volatile liquids which serve to depress the vapor pressure of water more than the vapor pressure of acetic acid. Acidification is not necessary to free the acetic acid in this case, but the multi-cell evaporator is used to advantage with the variations of processing which have been described, depending on the particular physical properties of the solutions being handled.

It is obvious from these examples and many others which may be cited as indicative of the scope of this invention that any standard type of distillation process or equipment may be used which is known to the art and which is suitable for working with such solutions. The use of any standard equipment and usual processing techniques are within the scope of this invention, also the standard methods of making anhydrous acid from the concentrated acid solutions which result from this processing and of separating and refining the respective acids from each other. Thus, for example, the small amount of furfural usually present in pulping liquors passes through the system and must be separated from the final acid mixture produced in the refining steps.

In the above description of this invention, the use of sulfuric acid has been specified but other acids which will accomplish the same purpose may also be used. These acids are those which have little or no volatility if used in the acidifying column and will be sufficiently strong to free the acetic acid or other volatile fatty acid. If a volatile acid such as muriatic acid is used to free the volatile aliphatic acids, the acidification is done separately; and the solution of free acetic acid and its salts and any other solids is fed to the multi-cell evaporator. Usually sulfuric acid is used; and that with the minimum amount of water present is desired, since all such water added must ultimately be separated from the acetic acid. Furthermore, the hydroscopic effect, a most important part of the use of sulfuric acid in the acidifying column, is much greater with acid of higher concentration. Thus, while 100% acid is preferable, a lower concentration may be used, down to 50% or even less, although the advantages noted above are reduced accordingly.

The vapors from the acidifying column or the evaporator are fed to an azeotropic still in most of the examples above; but the separation of water from acetic acid may be accomplished in any other type of distilling system wherein most of the water is removed overhead, and a concentrated acid is produced in the lower part of the distilling column and discharged from the bottom. This may instead be by ordinary rectification with the considerable expenditure of heat which will be required for this usual distillation; or this concentration of the acetic acid may be by an extractive distillation wherein a high boiling liquid is circulated to the top of the column to extract the acetic acid rising in the vapor phase and then to discharge it at the bottom in solution with the high boiling liquid, from which it is subsequently separated. Thus this invention may be used directly with and by supplying a vapor feed to either one of these three types of distillation, azeotropic, simple rectification, or extractive. Furthermore, if the vapors after acidification are condensed to a liquid, either by the system indicated in Figure 5 or other, any known method of concentration of acetic acid from an aqueous solution including these three methods of distillation, extraction, or other method may be used.

I claim:

1. The process of preparing concentrated volatile aliphatic acids from an industrial aqueous liquor containing their salts comprising subjecting said aqueous liquor to simultaneous acidification and multi-cell evaporation to remove progressively said acids with water, as vapors; conveying said vapors in an upward stream; passing concentrated liquid non-volatile aqueous acid downwardly through said upward moving vapor stream of aliphatic acids and water; removing some of the water from said vapor stream by said liquid non-volatile acid upon contact between the liquid non-volatile acid and the water in said vapor stream to yield a diluted liquid non-volatile acid solution; and reacting said diluted liquid non-volatile acid solution with the salts of said volatile aliphatic acids in the industrial liquor to accomplish said acidification, and to facilitate the obtaining of said volatile aliphatic acids from said liquor in a free form; and evaporating substantially completely said volatile aliphatic acids along with some water from said liquor.

2. The process of claim 1 wherein the industrial liquor is waste liquor obtained from the alkaline pulping of cellulosic material and wherein the dilute, liquid non-volatile acid solution is sent proportionally to each of a plurality of cells of the multi-cell evaporator in such amount that to each of the cells except the last there is added a sufficient amount of the said non-volatile acid to the liquor to liberate vapors of free volatile aliphatic acids from the liquor passing to each successive cell in series.

3. The method of preparing concentrated volatile fatty acids of low molecular weight from industrial liquors containing their salts in solution, comprising acidifying said salts with a non-volatile acid; evaporating said liquor after acidification in the successive cells of a multi-cell evaporator; removing as the combined vapors from said said cells a vapor mixture of said fatty acids and water; treating said vapor mixture of water and of said volatile fatty acids of low molecular weight with a stream of concentrated, non-volatile strong acid flowing in countercurrent contacting relationship to said vapor stream; removing water from said vapor mixture by contacting said stream of concentrated non-volatile strong acid to yield a diluted solution of said strong acid; and adding said diluted solution of said strong acid to said industrial liquor in said evaporator to acidify said liquor and to facilitate steaming out of said volatile fatty acids from said liquor.

4. The process of claim 1 wherein the identical aqueous liquor is waste liquor obtained from the neutral sulfite semi-chemical process for pulping of wood.

References Cited in the file of this patent

UNITED STATES PATENTS

| | | |
|---|---|---|
| 1,795,557 | Hagglund | Mar. 10, 1931 |
| 2,279,764 | Smith et al. | Apr. 14, 1942 |
| 2,714,118 | Copenhaver et al. | July 26, 1955 |

OTHER REFERENCES

Klar: Wood Distillation, pub. by Chapman & Hall Ltd., London (1925), pp. 297 and 298.